United States Patent
Aida et al.

(10) Patent No.: US 6,191,250 B1
(45) Date of Patent: Feb. 20, 2001

(54) PROCESSES FOR THE PREPARATION OF A MONODISPERSE POLYMERS, PROCESSES FOR THE CONTINUOUS POLYMERIZATION OF CYCLIC MONOMERS, AND POLYMERS PREPARED THEREBY

(75) Inventors: Takuzo Aida, Kashiwa; Jun Watanabe, Ohtake, both of (JP)

(73) Assignee: Daicel Chemical Industries, Ltd., Osaka-Fu (JP)

( * ) Notice: Under 35 U.S.C. 154(b), the term of this patent shall be extended for 0 days.

(21) Appl. No.: 09/331,022

(22) PCT Filed: Oct. 15, 1998

(86) PCT No.: PCT/JP98/04674

§ 371 Date: Jun. 15, 1999

§ 102(e) Date: Jun. 15, 1999

(87) PCT Pub. No.: WO99/19379

PCT Pub. Date: Apr. 22, 1999

(30) Foreign Application Priority Data

Oct. 15, 1997 (JP) .................................................. 9-297869
Oct. 15, 1997 (JP) .................................................. 9-297870

(51) Int. Cl.[7] .................................................. C08G 64/00
(52) U.S. Cl. .......................................... 528/196; 528/198
(58) Field of Search ..................................... 528/196, 198

(56) References Cited

FOREIGN PATENT DOCUMENTS

| | | | |
|---|---|---|---|
| 63-189428 | * | 8/1988 | (JP) . |
| 4-114031 | * | 4/1992 | (JP) . |
| 4-323204 | * | 11/1992 | (JP) . |
| 5-247184 | * | 9/1993 | (JP) . |
| 6-287280 | * | 10/1994 | (JP) . |
| 07097453 | * | 4/1995 | (JP) . |
| 99/19379 | * | 4/1999 | (WO) . |

* cited by examiner

Primary Examiner—Terressa M. Boykin
(74) Attorney, Agent, or Firm—Morgan & Finnegan, LLP

(57) ABSTRACT

The present invention relates to a method for preparing lactone polymers, carbonate polymers, lactone-carbonate block copolymers and lactone-arbonate random copolymers via a ring-opening addition reaction of a lactone monomer, a cyclic carbonate monomer or a mixture thereof using an initiator and in the presence of a specific titanium-type Lewis acid catalyst. The resulting polymers have a molecular weight distribution (Mw/Mn) approximately equal to 1 or a extremely high purity of single-structure components. The polymer molecules range in an oligomer region to a molecular weight of approximately 200,000. The present invention also relates to a method for preparing lactone polymers, carbonate polymers and lactone-carbonate copolymers having a narrow molecular weight distribution and which can be obtained via a continuous polymerisation of a lactone monomer and/or a cyclic carbonate monomer using an initiator in an extruder in the presence of a specific titanium-type Lewis acid catalyst or an aluminium-type Lewis acid catalyst. The present invention also relates to these resulting polymers.

25 Claims, No Drawings

PROCESSES FOR THE PREPARATION OF A MONODISPERSE POLYMERS, PROCESSES FOR THE CONTINUOUS POLYMERIZATION OF CYCLIC MONOMERS, AND POLYMERS PREPARED THEREBY

TECHNICAL FIELD

The present invention relates to a method for preparing a lactone polymer, a carbonate polymer, a lactone-carbonate copolymer and a lactone-carbonate random copolymer by using specific polymerisation catalysts.

More particularly, the present invention relates to a method for preparing a lactone polymer, a carbonate polymer, a lactone-carbonate copolymer and a lactone-carbonate ..random copolymer which are monodispersed i.e. have a molecular-weight distribution value of Mw/Mn of approximately 1 which is represented by a ratio of weight-average molecular-weight (Mw) with respect to the number average-molecular weight (Mn) or have a single-structure component of a very high purity. The present invention also relates to a method for producing a lactone polymer, a carbonate polymer, a lactone-carbonate copolymer by continuously polymerising a lactone and/or a cyclic carbonate in an extruder with an initiator. The present invention also relates to the lactone polymers, carbonate polymers and lactone-carbonate copolymers which may be obtained according to this process and which have a narrow molecular-weight distribution.

TECHNICAL BACKGROUND

The ring-opening polymerisations of cyclic monomers like lactones or cyclic carbonates can normally be divided into two large categories anionic polymerisations using organometallic compounds as initiator and polymerisations using compounds having an active hydrogen such as water and alcohol as initiator and many sorts of broadly-called Lewis acids as catalysts.

The organometallic compounds used as initiators in the former anionic polymerisations may be illustrated by n-butyllithium, potassium tert-butoxide, sodium methoxide and a complex of rare earth metals. Specifically, JP-A46037737 describes the synthesis of a polystyrene-polycaprolactone block-copolymer or the like, JP-A-02029432 describes the synthesis of a polycaprolactone-polyneopentyl glycol carbonate block-copolymer and JP-A-05500982 and JP-A-05247184 describe the synthesis of a polycaprolactone by using a rare earth metal complex.

The advantage of such anionic polymerisations is that it is possible to synthesize a polymer or a block copolymer having a narrow molecular weight distribution. This is possible through the use of a special reaction method in which the solvent and the cyclic monomer used are highly purified The catalysts of the latter polymerisations may be illustrated by sulphuric acid, para-toluenesulphonic acid, quaternary ammonium salts, boron trifluoride, tin tetrachloride, trialkyl aluminium, titanium (IV) butoxide, dibutyl tin oxide or other broadly-called Lewis acids.

These several sorts of Lewis acid act to lower the energy required to open the ring of monomers like lactone monomer and cyclic carbonate monomers. At the same time, they increase the nucleophilicity of initiators such as water or alcohols.

The initiator in ring-opening reactions is water or an alcohol. However, water and alcohol are at the same time reaction terminators and chain-transfer agents. Therefore, it is difficult to obtain a polymer or a block-copolymer having a narrow molecular-weight distribution according to such anionic polymerisation Among polymerisations using broadly-called Lewis acids as catalysts, as a method which enables obtaining polymers and block-copolymers having a narrow molecular weight distribution, the method for synthesising a monodispersed lactone polymer is reported in Macromolecules 1987, 20, 2982–2988 by Inoue, Aida et al. This report describes the synthesis of a polycaprolactone polymer having a number-average molecular-weight of 1,100 to 10,400 measured by a GPC method and a molecular weight distribution value ranging from 1.10 to 1.18 by using an aluminium porphyrin complex as catalyst.

Further, in Makromol. Chem., Macromol. Symp. 1991, 42143, 117–133, Okamoto has synthesized a polylactone-diol polymer having a number average molecular-weight of approximately 3,000, measured by a GPC method, a molecular weight distribution value of approximately 1.25–1.31 by using triethyloxonium hexafluorophosphonate as a catalyst and ethylene glycol as initiator.

Moreover, according to EP 0600417 A1, it is possible to obtain a polymer having a molecular weight distribution value of approximately 1.7 to 2.1 via a ring-opening reaction of a cyclic carbonate and by using a hydroxyalkyl (meth) acrylate and polyvalent alcohols as initiators and an onium salt of an anionic Bronsted acid, strong acid ion-exchange resins, alkyl alkali metals, alkali metals alkoxides, amines, tin compounds, tungsten compounds, titanium compounds, or zinc compounds as catalyst.

On the other hand, recently, the use of necessarily high functional products and high added-value products has increased in fields like modifiers for resins, paints, modifiers for surface, adhesives or the like. Consequently, the needs for lactone polymers, carbonate polymers and lactone-carbonate copolymers having a narrow molecular weight distribution and a high purity regarding their single-structure components have also increased.

However, in order to obtain polymers of lactones having a specific structure or carbonate polymers via an anionic polymerisation method, a large amount of organometallic compounds have to be added as catalyst. Consequently, it is due to this large amount of organometallic compounds that several problems occur: it is difficult to control the reaction heat and the metallic components that remain seriously deteriorate the heat stability of the polymer.

Specifically, a one-step synthesis of methacrylic-modified lactone-polymer obtained by adding therein 2-hydroxyethylmethacrylate, 1 to 5 times mole amount of caprolactone is very difficult and not economically interesting via an anionic polymerisation.

Further, in the above-mentioned aluminium porphyrin system, the reaction speed is very slow and thus it takes more than ten days to synthesise the above-mentioned polycaprolactone polymers and the synthesised products are extremely coloured and thus cannot be used in practice.

Moreover, in the above-mentioned triethyloxonium hexafluorophosphonate system, a period of 24 hours at 30° C. is necessary to obtain the polylactone-diol polymer and, moreover, about 5% of the lactone monomer remains ; on the other hand, the molecular weight distribution value increases when trying to improve the lactone monomer conversion to approximately 100%.

In order to solve such problems, the applicant has already discovered a method which is reported in JP-A-72920B3.

This method consists in using specific aluminium-type Lewis acids as catalysts. According to this, it is possible to produce certain kinds of low dispersion polymers having a molecular weight distribution value of 1.0 to 1.5.

Lactone polymers and cyclic carbonate polymers are usually produced according to non-continuous processes. Particularly, in order to obtain high molecular-weight polymers, there are some difficulties in extruding such polymers due to their high viscosity which involve the unnecessary prolongation of heating time then deteriorating the physical properties of resins.

From the point of view of productivity increase, it is necessary to increase the reaction rate when increasing the amount of catalyst to be added. However, the non-continuous devices have generally limited heat transfer capacity.

In order to solve such a problem, a continuous process for producing lactones and cyclic carbonates has already been disclosed (EP-A-0 372 221 applied by Boehringer Ingelheim KG). In this document, the possibility of producing, in general, a poly-ϵ-caprolactone has been disclosed. However, a single catalyst and a single initiator have been disclosed. Moreover, in this document, for example, a tin salt such as stannous chloride and stannous octoate are mentioned as preferable. Further this method cannot be considered as suitable to continuously produce poly-ϵ-caprolactones in an extruder because of the recommended catalyst used to obtain industrially-allowable rate of conversion to poly-ϵ-caprolactones, and requires several hours for polymerisation.

According to a method using an extruder, the catalysts which may be used generally in an esterification reaction or a transesterification reaction are, for example, acetic salts of lead, zinc, manganese, calcium, cobalt, magnesium, antimony, aluminium, titanium, and tin etc., carbonates, halogenated compounds, oxides, alkylated compounds, alkoxides, particularly, halogenated compounds of aluminium, titanium, and tin, alkylated compounds, alkoxides or the like may be used. However, the molecular-weight distribution may be generally broad compared to a batch-type reactor.

JP-A07053686 proposes, from a point of view of improving the production rate, the use of aluminium alkoxides as polymerisation initiator to produce a poly-ϵ-caprolactone via an extruder. However, methods using metal alkoxides as polymerisation initiators are used to produce extremely high-molecular weight polymers as explained in JP-A-07053686. Thus, in the case of the production of relatively low molecular-weight polymers, there is a bad influence on physical properties and on the stability of the synthesised products due to the amount of metal contained in the resin.

Further, generally, in the case of a polymerisation reaction carried out in extruders or other continuous reaction device, the molecular weight distribution tends to be large because of the different portions of the reaction process which are not mixed each other. According to JP-A-07053686, it is possible to obtain polymers having a molecular weight distribution value of at least 2.2.

The purpose of the present invention is to provide lactone polymers, carbonate polymers, lactone-carbonate random copolymers and lactone carbonate block copolymers having a narrow molecular weight distribution or being monodispersed.

Another purpose of the present invention is to provide a continuous method for producing in a short time and efficiently the above-mentioned polymers.

DISCLOSURE OF THE INVENTION

The inventors of the present invention have intensively carried out investigations concerning continuous methods for producing in a short time and efficiently lactone polymers, carbonate polymers, lactone-carbonate random copolymers and lactone carbonate block copolymers. As a result of these investigations, the applicant inventors have found that the use of a specific titanium-type Lewis-acid as a catalyst is very efficient and they found that the former polymers obtained with this method have an extremely narrow molecular-weight distribution. Therefore, they have achieved the present invention.

Further, as a result of this investigation regarding continuous methods for producing in a short time and efficiently lactone polymers, carbonate polymers, lactone carbonate random copolymers and lactone carbonate block copolymers, the inventors of the present invention found that the use of specific aluminium-type Lewis-acid or titanium-type Lewis-acid as catalysts is extremely efficient for the continuous polymerisation in an extruder. They also found that the polymers obtained have advantageously a narrow molecular-weight distribution. Thus, they have achieved the present invention.

A first aspect of the present invention provides a method of preparing a monodispersed polymer via a ring-opening addition-reaction between a lactone monomer (b1), a cyclic-carbonate monomer (b2) or a mixture of the lactone monomer (b1) and the cyclic carbonate monomer (b2), using an initiator (a), the method being characterized in that the titanium-type Lewis acid catalyst (cT) of General Formula T1 is used as a catalyst

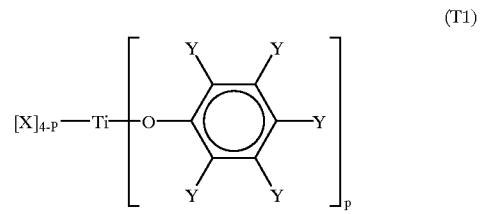

(T1)

wherein X is selected from alkoxy groups (when shown by RO, R is an alkyl group which may have any substituents ), a chlorine atom, a bromine atom, an iodine atom, Y is a hydrogen atom or a substituent, P is an integer from 1 to 4.

A second aspect of the present invention provides a lactone-carbonate random copolymer obtained according to the method of the first aspect of the invention, via reacting a total mole amount of the lactone monomer (b=b 1) and the cyclic carbonate monomer (b2) or the mixture (b3) thereof comprised between 1 and 100 moles with respect to 1 mole of the initiator (a).

A third aspect of the invention provides a method of preparing lactone-carbonate random copolymers via a ring-opening addition reaction of a lactone monomer (b1) and a cyclic carbonate monomer (b2) with an initiator (a) until one of the monomers is consumed and then by undertaking a ring-opening addition reaction of the remaining monomer, the method being characterised in that the titanium-type Lewis acid of the above-mentioned General Formula T1 is used as catalyst.

According to a fourth aspect of the invention, the titanium Lewis acid (cT) of General Formula T2 is used as catalyst in methods for preparing monodispersed polymers of the first, second and third aspects of the invention

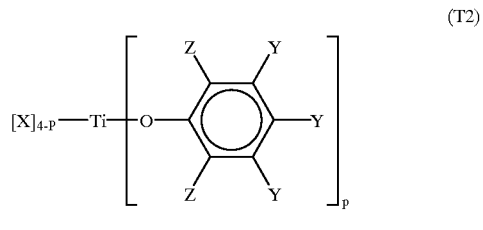

(T2)

wherein X is selected from alkoxy groups (when shown by RO, R is an alkyl group which may have any substituents), a chlorine atom, a bromine atom, an iodine atom, Y is a hydrogen atom or a substituent, Z is chosen among tert-butyl groups, phenyl groups, a chlorine atom, a bromine atom, a iodine atom and P is an integer from 1 to 3.

According to a fifth aspect of the invention, in the methods of the first, second, third or fourth aspect of the invention, the initiator (a) is a polyvalent alcohol containing 2 to 10 hydroxyl groups in its molecule or an alcohol containing 1 hydroxyl group and one double bond which is radically polymerisable.

According to a sixth aspect of the invention, the titanium-type Lewis acid (cT) of General Formula T3 is used as catalyst in methods for preparing monodispersed polymers of the first, second, third, fourth or fifth aspect of the invention

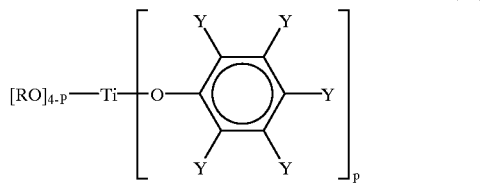

(T3)

wherein is an alkyl group which may have any substituent, Y is a hydrogen atom or a substituent, P is an integer from 1 to 3.

The seventh aspect of the invention relates to a method for preparing lactone polymers characterised in that a lactone monomer (b1), a cyclic carbonate monomer (b2) or a mixture (b3) thereof are continuously polymerised using an initiator (a) in an extruder via a ring-opening addition-reaction the aluminium-type Lewis acid (cA) of General Formula A1 or the titanium-type Lewis acid (cT) of General Formula T1 being used as catalyst

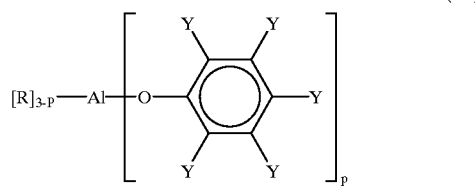

(A1)

wherein R is an alkyl group having 1 to 4 carbons, Y is a hydrogen atom or a substituent, P is an integer from 1 to 3.

According to an eighth aspect of the present invention, the aluminium-type Lewis acid (cA) of General Formula A2 or the titanium-type Lewis acid (cT) of General Formula T2 are used as catalyst in the method of the seventh aspect of the invention (A2)

wherein R is an alkyl group having 1 to 4 carbons, X is selected from tert-butyl groups, phenyl groups, a chlorine atom, a bromine atom, a iodine atom, Y is a hydrogen atom or optionally a substituent.

The ninth aspect of the invention relates to lactone polymers, cyclic carbonate polymers and lactonecyclic carbonate copolymers having a weight average molecular weight (Mw) from 10,000 to 200,000 and a weight average molecular weight (Mw)/number average molecular weight (Mn) ratio from 1.0 to 2.5.

The tenth aspect of the invention relates to lactone polymers, cyclic carbonate polymers and lactone-cyclic carbonate copolymers of the ninth aspect of the invention which have a ratio of Mw/Mn from 1.2 to 2.0.

The eleventh aspect of the invention relates to lactone polymers, cyclic carbonate polymers and lactone-cyclic carbonate copolymers of the ninth or tenth aspect of the invention which have a gel content of not more than 20 gel-effect non-uniform spot per 0.1 $m^2$ of (co)polymers.

The twelfth aspect of the invention relates to lactone polymers of the ninth aspect of the invention having a weight average-molecular weight from 100,000 to 200,000.

The thirteenth aspect of the invention relates to cyclic carbonate polymers of the ninth aspect of the invention having a weight average-molecular weight from 10,000 to 200,000.

The fourteenth aspect of the invention relates to lactone-cyclic carbonate block copolymers having a weight average-molecular weight from 30,000 to 200,000.

The fifteenth aspect of the invention relates to lactone-cyclic carbonate random copolymers having a weight average-molecular weight from 10,000 to 200,000.

According to the present invention, a lactone homopolymer, a cyclic carbonate homopolymer, a random copolymer, a black copolymer, and a random-black copolymer, can be obtained which have molecular weight in an oligomer region, a weight average molecular weight (Mw) of not more than 10,000 which belongs to a low molecular weight region, a weight average molecular weight (Mw) of 10,000 to 100,000 a weight average molecular weight of 100,000 to 200,000, a number average molecular weight of not more than 5,000, 5,000 to 70,000, not less than 70,000 and not less than 100,000 and Mw/Mn of 1.0 to 2.5, and 1.2 to 2.0 can be obtained.

BEST MODE OF CARRYING OUT THE PRESENT INVENTION

Practical embodiments of the present invention will be explained further hereinafter.

In the present invention, the term a monodispersed (co) polymeric is commonly defined as follows:

In the case of an addition polymer obtained from a mole amount of a lactone monomer and/or a carbonate monomer ranging from 1 to 10 times with respect to the mole amount of the initiator, or in case of a polymer having a number-average molecular-weight less than 1,000, the molecular-weight distribution as measured by gel permeation chromatography (referred as GPC) reveals that the purity of the entire component with respect to a component having a molecular weight corresponding to the center of the molecular-weight distribution or dispersion (which is an adduct into which a specific mole amount of the cyclic monomer has been introduced by addition polymerisation) is at least 50%, preferably at least 70% and more preferably, at least 90%; when the number-average molecular weight of the polymer is at least 1,000, the distribution measured by GPC is unimodal (single peak).

According to the present invention, <<low distribution>> means that the ratio weight-average molecular-weight/number-average molecular-weight (molecular-weight distribution value) is ranging from 1.0 to 1.5, preferably from 1.0 to 1.2 and more preferably from 1.0 to 1.1.

Consequently, the lactone polymers, carbonate polymers and lactone-carbonate polymers of the present invention are abbreviated as monodispersed polymers even if they are monodispersed and at the same time have a low dispersion.

Initiator (a)

The initiators (a) in the present invention are compounds having an active hydrogen in the molecule such as, for example, hydroxyl group, amino group, carboxyl group, thiol group, and active hydrogen group sandwiched between at least two electron-attracting groups.

Generally, as aliphatic monoalcohols and aliphatic polyvalent alcohols, the following compounds may be given as examples: methanol, ethanol, isopropanol, 2-hydroxydiethyl (metha)acrylate, 4-hydroxybutyl(meth)acrylate, allyl alcohol or the like may be given as examples for mono-alcohol compounds; ethylene. glycol, diethylene glycol, butanediol, hexamethylene glycol, neopentyl glycol, trimethyrol propane, pentaerythritol, polyvinylalcohol, 2-hydroxy ethyl (meth)acrylate-modified polymers and ethylene oxide-supplemented compounds of bisphenol A may be given as examples of polyvalent alcohols.

In the examples above described and in the whole specification, (meth) acrylate refers to acrylates or methacrylates.

Lactone Monomers (b1)

The lactone monomers used in the present invention may be well-known compounds. However, generally, β-propiolactone, γ-butyrolactone, δ-valerolactone, ε-caprolactone and the alkylated derivatives thereof, enantolactone or the like may be given as examples. In practice, δ-valerolactone, ε-caprolactone and the alkylated derivatives thereof are preferably used.

Cyclic Carbonate Monomers (b2)

As cyclic carbonate monomers, the following compounds are suitably used : propylene glycol carbonate, 2-methyl-1, 3-propanediol carbonate, neopentyl glycol carbonate or other alkyl glycol carbonates.

Mixtures (b3)

Instead of using a lactone monomer (b1) and a cyclic carbonate monomer (b2) alone, it is also possible to use a mixture (b3) thereof. Moreover, in this case, one or several kinds of lactone monomers and one or several kinds of cyclic carbonate monomers may be used. The mole ratio of the lactone monomer (b1) and the cyclic carbonate monomer (b2) in the mixture (b3) may be freely chosen but preferably it is 5/95 to 95/5, and more preferably 10/90 to 90/10.

Initiator/Monomer Mole Ratio

According to the present invention, the mole amount of lactone monomer (b1), cyclic carbonate (b2) or a mixture thereof (b3) is provided or introduced in a mole amount of 1 to 10,000 moles based on one mole of the initiators, and preferably in an amount of 1 to 5,000 moles based on one mole of the initiators and more preferably in an amount of 1 to 1,000 moles based on one mole of the initiators.

In the case of a continuous polymerisation, this amount is 100 to 10,000, preferably, 100 to 5,000 and more preferably 400 to 2,000 moles based on one mole of initiator.

When this amount exceeds the above-mentioned ranges, the rate of reaction in the ring opening polymerisation is slowed down or it is not possible to obtain a monodispersed polymer or the distribution value of this polymer is too large which is not desirable.

When this amount is less than the above-mentioned ranges, the viscosity is too low which is not suitable when using a extruder.

The amount of the mixture (b3) which is used with respect to the initiator (a) should be in the above-mentioned ranges in order to obtain a polymer having a high molecular weight.

However, it is also possible to adjust this amount in the range of, for example, 1 to 100 mole or less. When the mixture (b3) is provided or introduced in an amount ranging from 1 to 100 moles, it is possible to produce a monodispersed lactone single-polymer having a low molecular weight a carbonate single-polymer a lactone-carbonate copolymer or a lactone-carbonate random copolymer.

Organic Aluminium-Type Lewis Acid (cA)

The organic aluminium-type Lewis acid (cA) in the present invention may be represented by the above-described general formula A1. In the general Formula A1, R is an alkyl group having 1 to 4 carbons, specifically and for example, a methyl group, an ethyl group, n-propyl group iso-propyl group, n-butyl group, iso-butyl group or tert-butyl group.

Y is a hydrogen atom or eventually a substituent. Specifically, this substituent may be a methyl group, an ethyl group, a butyl group, a tert-butyl group or other alkyl group, phenyl group or allyl, a fluorine atom, a chlorine atom, a iodine atom or other halogen atom, a trimethylsilyl group or a trimetylgelmyl group. Y may be identical to or different from each other.

P is an integer equal to 1, 2 or 3. When P is equal to 1, the rate of the ring-opening addition reaction of the cyclic monomer is high but the molecular weight-distribution of the resulting polymer has a tendency to be wide. When P is equal to 3, it is difficult to prepare the catalyst and thus, P is most preferably equal to 2.

The compounds represented by the general Formula A2 are preferably chosen as the organic aluminium-type Lewis acid (CA) represented by the above-mentioned Formula A1. The organic aluminium type Lewis acid of Formula A2 correspond to the organic aluminium-type Lewis acid represented by Formula A1 when P with P equal to 2. X is then selected from tert-butyl group, phenyl group, a chlorine atom, a bromine atom and an iodine atom. X may be identical to or different from each other.

In the case that X is a hydrogen atom or a substituent which is not bulky such as methyl group, steric hindrance between the catalyst particles becomes weak and association between the catalyst particles is generated. As a result, there is a decrease of coordination effect with respect to the catalyst by the lactone monomer and/or the cyclic carbonate. Accordingly, X is preferably selected from the above-mentioned groups in order to obtain a more monodispersed polymer.

The aluminium-type Lewis acid catalysts (cA) used in the present invention to obtain a monodispersed polymer may be obtained, for example, by reacting 2, 6-diphenylphenol, 2, 6-di-tert-butyl4-methylphenol, 2, 4, 6-trichlorophenol, 2, 4, 6-tri-t-butyl phenol or other alkyl-substituted phenol and trimethyl alluminum, isobutyl aluminium or other trialkyl aluminium.

The mole ratio of the compounds to be reacted is alkyl-substituted phenol/trialkyl aluminium =5/1 to 1/1 and preferably, 2.5/1 to 2/1.

The reaction temperature is preferably from 0° C. to room temperature.

Further, as an organic solvent used for the reaction, the following compounds or their mixtures may be given as examples: hexane, cyclohexane, heptane, octane, decane or other aliphatic hydrocarbons, benzene, toluene, xylene or other aromatic hydrocarbons, chloroform, dichloromethane or other halogenated solvents.

These catalysts are obtained as white crystals or as organic solvent solutions.

Titanium-Type Lewis Acid (cT)

According to the present invention, the titanium type Lewis acids (cT) are represented by the above-described General Formula T1 wherein X is an alkyl group, a chlorine atom, a bromine atom or an iodine atom when RO is an alkoxy group, R is an alkyl group which may be optionally substituted.

Non-substituted alkoxy groups may be, for example, a methoxy group, ethoxy group, n-propoxy group, iso-propoxy group, n-butoxy group, iso-butoxy group or tert-butoxy group, etc.

The optionally substituted-alkoxy groups are, for example, halogen-containing groups such as 2-chloropropoxy group, groups containing alkoxy groups such as 2-methoxyethoxy group.

Y is a hydrogen atom or eventually a substituent. As a substituent group, specifically, methyl group, ethyl group, butyl group tert-butyl group or alkyl group, phenyl group or allyl group, methoxy group, ethoxy group or other alkoxy group, a fluorine atom, a chlorine atom, an iodine atom or other halogen, trimethylgelmyl group. Y may be identical to or different each other.

P is an integer from 1 to 4. When P is equal to 1, the rate of the ring-opening addition reaction of the cyclic monomer is high but the molecular weight distribution of the resulting polymer has a tendency to be wide. When P is equal to 3 or 4, it is difficult to prepare the catalyst and thus, P is most preferably equal to 2.

When P is not less than 2, there may be several phenoxy groups which may create binding via substituent Y without any problems. In that case, Y may chosen among a methyl group or other alkyl group, a sulphur atom (-S—), an oxygen atom (—O—).

As titanium-type Lewis acid (cT) represented in general Formula T1, the former compounds shown in the above-described General Formula T2 are preferable. Regarding the titanium-type Lewis acid of General Formula T2, the value of P is selected from 1 to 3 in General Formula T1, Z is selected from tert-butyl group, phenyl group, a chlorine atom, a bromine atom and an iodine atom. Z may represent several identical groups or different groups. When Z is a hydrogen atom or a substituent which is not bulky such as methyl group, steric hindrance between the catalyst particles becomes weak and association between the catalyst particles is generated. As a result, there is a decrease of the co-ordination effect of catalysts by the lactone and/or cyclic carbonate. Consequently, Z is preferably selected from the above-mentioned groups in order to obtain a more mono-dispersed polymer.

Compounds shown in the above-described General Formula T3 are preferably used as titanium-type Lewis acid of General Formula T1. Regarding the titanium-type Lewis acid of General Formula T3, P of the above-described General Formula T1 is an integer from 1 to 3, X is an alkoxy group represented by RO; R is an alkyl group which may have any substituent.

The substituents may be, for example, methoxy group, ethoxy group, n-propoxy group, iso-propoxy group, n-butoxy group, iso-butoxy group and tert-butoxy group.

Alkoxy-halogen containing groups such as 2-chloropropoxy group and alkoxy groups containing an alkoxy group such as 2-methoxy ethoxy group may be given as examples of substituents which may have alkoxy groups.

In Y, the ortho substituent of the phenoxy group are preferably bulky groups as in the above-described General Formula T2.

According to the present invention, it is also possible to use a Lewis acid catalyst having in its molecule at least one phenoxy group as a ligand which have the same structure as the above-mentioned aluminium-type Lewis acid catalysts and titanium-type Lewis and catalysts. This phenoxy group may contain from 1 to 5 substituents such as methyl group, ethyl group, butyl group, tert-butyl group or other alkyl groups, phenyl group or allyl groups, a fluorine atom, a chlorine atom, an iodine atom or other halogen-containing groups, trimethylsilyl group, or trimethylgelmyl group. In addition to the above-described aluminium and titanium, lead, zinc, manganese, calcium, cobalt, magnesium, antimony or tin may be used. Particularly, aluminium, titanium and tin are preferably used.

These catalysts may be used in a batch polymerisation method, semi-batch polymerisation methods and continuous polymerisation methods. They may be advantageously used in continuous polymerisation methods using an extruder.

The catalyst used in the polymerisation method of the present invention in order to obtain a monodispersed polymer may be obtained as follows. They may be obtained by reacting substituted phenols such as 2, 6-diphenylphenol, 2, 6-di-t-butyl4-methylphenol, 2, 4, 6-trichlorophenol, 2, 4, 6-tri-t-butylphenol with titanium tetrachloride or other halogenatised titanium compounds, or titanium (IV) isopropoxide, titanium (IV) butoxide or other titanium oxides.

The mole ratio of these reactants is substituted phenol /titanium oxides=5/1 to 1/1, preferably, 2.5/1 to 2/1. The reaction temperature is preferably from 0° C. to room temperature.

Further, the same organic solvents as used in the case of the above-mentioned organic aluminium-type Lewis acid catalysts (cA) may be used as organic solvent for the reaction.

The catalysts may be obtained as crystals or an organic solution of solvent.

The synthesis of such organic aluminium-type Lewis acid catalysts (cA) or titanium-type Lewis acid catalysts (cT) is possible from a mixture of an initiator, a lactone in the presence of a monomer such as a cyclic carbonate. However, the synthesis rate of the catalyst is slowed down due to the dilution or the resin obtained tends to show a large molecular-weight distribution. Consequently, the synthesis comprises preferably a pre-synthesis.

Moreover, a method to obtain the titanium-type Lewis acid catalyst (cT) which contains an alkoxy group may be to react a cyclic ether such as propylenoxide or oxetane with a titanium compound which contains a phenoxy group and a halogen atom and which may be obtained as previously described.

Amount of Catalyst

The mole amount of aluminium-type Lewis acid catalyst (cA) or titanium-type Lewis acid catalyst (cT) used is normally 0.0001 to 1 mole, preferably 0.01 to 0.5 mole and more preferably 0.05 to 0.2 mole with respect to one mole of initiator (a).

The smaller the amount of catalysts used is, the narrower the molecular weight distribution of the monodispersed polymers is. However, when the mole amount of catalysts is less than 0.0001 mole, the rate of the ring opening reaction of the cyclic monomer is slowed down ; when the mole amount of the catalyst is more than 1 mole, it is excessive without any meaning.

Impurities and Water Content

In order to obtain polymers having a more monodispersed molecular weight distribution according to the methods for preparing lactone polymers, carbonate polymers, lactone-carbonate block copolymers and lactone-carbonate random copolymers of the invention, initiator (a), lactone monomers (b1), cyclic carbonate monomers (b2) or mixtures thereof (b3), aluminium-type Lewis acid catalysts (CA) or the titanium-type Lewis acid catalyst (cT) which are as pure as possible are preferably used to prevent and control any side reaction.

For the same reasons, the preparative apparatus is preferably an apparatus which enables preventing mixtures of compounds other than starting materials, other than (or except) the solvent.

The above-mentioned impurities including water, etc. have a total weight of not more than 5,000 ppm, preferably not more than 500 ppm and more preferably not more than 50 ppm.

The smaller the water content in the reaction system is, the fewer the impurities in the resulting polymer are, the narrower the molecular- weight distribution thereof is.

Solvent for the Polymerisation Reaction

According to the present invention, hexane, heptane, cyclohexane or other aliphatic hydrocarbons, benzene, toluene, xylene or other aromatic hydrocarbons, chloroform, dichloromethane or other halogenated-type solvents may be given as examples of solvents which can be used for the polymerisation reaction. The amount of solvent is not limited and may be used in a suitable amount.

Reaction Conditions

According to the present invention, the order and method for introducing the reaction starting materials which are the initiator (a), the lactone monomers (b1), the cyclic carbonate monomer (b2) or a mixture (b3) of a lactone monomer and the cyclic carbonate monomer (hereinafter referred by the general term cyclic monomers (b)) and the aluminium-type Lewis acid catalyst (cA) or the titanium-type Lewis acid catalyst (cT) (hereinafter referred as by the general term catalyst (c) and optionally the solvent is not limited (except the introduction of the two cyclic monomers for the preparation of a block polymer).

A reaction temperature of 0° C. to 240° C. is possible to carry out the invention. The lower the reaction temperature is, the more monodispersed the polymer obtained is and the narrower the molecular-weight distribution thereof is. Normally, the reaction temperature is preferably from room temperature to 20° C.

When the reaction temperature is high, the molecular-weight distribution of the polymer to be synthesised has a tendency to be large. However, on the other hand, when the purpose of the invention is to increase the productivity (reaction rate), a higher reaction-temperature is suitable.

However, when the reaction temperature is too high, thermal decomposition of the polymer occurs as well as a discoloration thereof and a decrease of their thermal stability which is not suitable. From this point of view, the reaction temperature is preferably from 150° C. to 200° C. in order to sufficiently achieve the characteristic of the invention which is to obtain a polymer having a narrow molecular-weight distribution and in the same time to maintain a high productivity.

Inversely, even when the reaction temperature is too low, there is no problem but the reaction rate is not slowed down. There are almost no other conditions to limit the reaction.

The reaction period of time depends on the reaction temperature, the mole ratio of initiator/ monomers, the concentration of the catalysts. However, normally the reaction period of time is of 0.5 to 600 minutes. Preferably, the reaction period of time is of 1 to 240 minutes to obtain in the same time a narrow molecular weight distribution which is the characteristic of the invention and a high productivity.

The reaction may be a batch reaction a semi-batch reaction or a continuous reaction.

When the reaction is carried out in batch, a polymer having a narrow dispersion is obtained but there are problems regarding mixing and taking out in the case of obtaining a high molecular weight polymer.

When the reaction is carried out continuously, the dispersion is a bit larger but since it is difficult to produce a gel it is suitable to obtain a film grade high molecular weight polymer.

Extruder Used for Continuous Preparation

The extruder used to carry out the continuous method of the present invention may be a commonly used extruder and it is also possible to use a device called as a kneader.

Any device able to mix several starting materials, to stir the resulting mixture and to carry it from the starting materials inlet to the outlet (die) and which is provided with heating and cooling means and vent for gas removing may be used.

A variety of known extruders of the prior art which are provided with one, two or a plurality of screws acting as stirrers and having a rotating axis in a same direction or in opposite directions are suitable to carry out the present invention.

An extruder having two screws rotating in a same direction is commonly used. Specifically, single-screw-type extruders, multiple-axis-type screw extruders, in line screw-type extruders, ventilation-type extruders, by-pass ventilation-type extruders or other screw type extruders may be given as examples. Further, elastodynamic extruders, hydrodynamic extruders, ram-type continuous extruders, roll-type extruders, gear type extruders or other non-screw extruders may also be used. Moreover, co-kneader, votator, screw-type kneader, internal mixer, double arm kneader, self cleaning-type kneader or other kneaders may be used.

Several extruders may also be used to carry out the present invention. These several extruders may be aligned in series. However, in order to remove a bit of the remaining monomers or the solvent or the like, these extruders is partially under low pressure to reduce the volatile impurities in the product. It is also possible to produce block copolymers by feeding different monomers in each feeding point of each extruder.

According to the present invention, the inside of the extruder(s) is replaced with nitrogen, helium, argon or other inert gas to react under an inert gas atmosphere which is suitable to prevent any possible contact between oxygen and water. These extruders may also be partially or wholly under reduced pressure.

Further Treatments

According to the present invention, due to the fact that when cyclic monomer remains in the reaction system, the synthesised polymer is monodispersed, a surplus of cyclic monomer is thus fed for the progress of the ring-opening reaction of the cyclic monomer (b) (<<living polymerisation >>). After reaching the target polymerisation rate, a method for removing the excess of cyclic monomer (b) may be used.

Further, after the termination of the ring opening reaction, the catalyst (c) may optionally be removed from the polymer synthesised.

Solvent separation, adsorption, reduced-pressure distillation and filtration may be given as examples of separation methods.

Regarding the solvent separation, any method using the solubility difference between the catalysts (c) and the synthesised polymer may be used.

Regarding the above-mentioned adsorption, activated carbon, silica gel, alumina, graphite, hydroxyl group-containing high-molecular weight compounds, amine groups, carboxyl groups and sulphoxide group or the like may be used as well as microporous ceramic or other base materials. Chromatographic methods and electrophoresis methods may be applied.

The reduced-pressure distillation is suitable for low molecular weight lactone polymers. Regarding filtration, according to the difference of particles sizes, filtration method using membrane or other base materials can be suitably used.

Polymers

The polymers which are preferably synthesised according to the method of the present invention are, for examples polyvalent hydroxyl group-containing polymers of General Formula P1 and (meth)acrylic group modified polymers of General Formula P2 which are characterised by the fact they are monodispersed polymers.

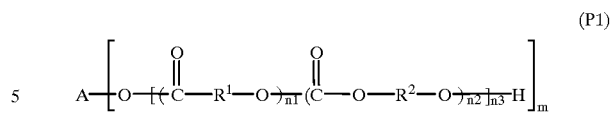

(wherein $R^1$ is —$(CR^3R^4)_k$— with k being an integer of 2 to 8, the groups $R^3$ and $R^4$ being independently hydrogen or methyl group; $R^3$ and $R^4$ may be identical or different groups, $R^2$ is an alkyl group of 1 to 10 carbons, $n_1$ and $n_2$ are both integer from 0 to 100, n1 and n2 are not equal to zero in the same time, $n_3$ is a 1 to 10 integer, m is a 2 to 10 integer. A represents the remaining groups from the m-valent alcohol; the order of the bonding between $n_1$ units having a structure derived from a lactone and $n_2$ units having a structure derived from a carbonate is not limited according to the present invention)

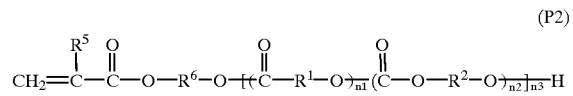

(wherein $R^1$ is —$(CR^3R^4)_k$— with k being an integer of 2 to 8, the groups $R^3$ and $R^4$ being hydrogen or methyl group; $R^3$ and $R^4$ may be identical or different groups, $R^2$ and Ra are alkyl groups of 1 to 10 carbons, $R^1$ is hydrogen or a methyl group, n, and $n_2$ are both integer from 0 to 100, n1 and n2 are not equal to zero in the same time, $n_3$ is a 1 to 10 integer; the order of the bonding between n, units having a structure derived from a lactone and $n_2$ units having a structure derived from a carbonate is not limited in the present invention)

Polyvalent Polymer (P1) Containing Hydroxyl Groups

The polyvalent polymer (P1) containing hydroxyl groups in the invention and which is shown by Formula P1 has not less than two hydroxyl groups at the termini in the molecule. Further, the polylactone polymer, the lactone copolymer, the polycarbonate polymer, the carbonate copolymer, the lactone-arbonate random copolymer and the lactone-carbonate block copolymer are characterised by the fact they are monodispersed polymers.

In the polymer (P1) containing polyvalent hydroxyl groups shown in the above-described Formula P1, $R^1$ may be for example, an ethylene group, a propylene group, a trimethylene group, a tetramethylene group, a pentamethylene group, a 2-methyltetramethyl group or the like. $R^2$ may be, for example, a trimethylene group, a propylene group, a 2-methyltrimethylene group, a 2, 2-dimethyltrimethylene group, a tetramethylene group or the like.

Further, in the Formula P1, $n_1$ and $n_2$ are not simultaneously equal to zero, each of them are an integer from 0 to 100 and preferably an integer from 1 to 50, $n_3$ is an integer from 1 to 10, m is an integer from 2 to 10 preferably 2, 3 or 4.

In the Formula P1, when nor $n_1$ nor $n_2$ is equal to zero and when $n_3$ becomes large, the polymer is a random polymer. On the other hand, when $n_3$ is small, the polymer is a block polymer. When either $n_1$ or $n_2$ is equal to 0, $n_3$ is then equal to 1.

In the prior art, there were some problems related to a decrease of the workability during the production of polyurethanes using polymers having not less than two hydroxyl groups at the termini of their molecules as polyurethanes starting materials and bad influence on the outer appearance of the polyurethanes products. The reasons for such problems are not only the large molecular distribution weight of the polymer but also the formation of cyclic dimers and polymers during macromolecularisation of the cyclic monomer.

On the other hand, when using the monodispersed polymers and copolymers (hereinafter referred to as polymers) of the present invention as starting materials for polyurethanes, the design of the molecule is easy since there are few impurities and since the molecular weight distribution is narrow. Consequently, the workability is improved during the production of polyurethanes and further the appearance of the resulting polyurethanes products is also improved.

Specifically, the advantages are as follows:

① it is possible to produce polyurethanes more easily

② the polyurethanes obtained have an improved thermal stability, an improved rigidity and an improved ductility.

③ the polyurethanes obtained have an improved fluidity and mouldability.

④ the polyurethanes obtained have a very good gloss and color hue and do not show any bleeding or orange-peel effect.

⑤ when producing the polyurethanes, there is no burn or scorching inside the producing apparatus and the moulding machines.

Synthesis of polyurethanes with few dimers of cyclic monomer or the like and having a narrow molecular weight distribution is reported in JP-A-03056251 and it the above-mentioned Makromol. Chem., Macromol. Symp. 1991, 42/43, 117–133. However, the polyvalent polymers containing hydroxyl group of the present invention have a molecular weight distribution preferably ranging from 1.0 to 1.2. Moreover, the polylactone polymers, the monodispersed polycarbonates, the lactone-carbonate random copolymers and the lactone-carbonate block copolymers are very pure substances substantially containing no dimer of cyclic monomer.

(Meth)Acrylic Group-Modified Polymer (P2)

The (meth)acrylic group-modified polymers of the invention are characterized by the fact they are monodispersed. That is to say, in the Formula P2, n1 and n2 are arranged in a high level.

R1 in the Formula P2 may be for example, ethylene group, a trimethylene group, a propylene group, a tetramethylene group, a pentamethylene group, or an hexamethylene group ; R2 may be a trimethylene group, a propylene group, a 2-methyltrimethylene group, a 2, 2dimethyltrimethyinene group or a tetramethylene group; n1 and n2 are each integer in the range of 1 to 100 and normally 1 to 10.

As well as in the Formula P1, in the Formula P2, when nor $n_1$ nor $n_2$ is equal to 0, when $n_3$ is big, the polymer is a random polymer. On the other hand, when $n_3$ is small, the polymer is a block polymer. When no or $n_2$ is equal to 0, $n_3$ is equal to 1.

(Meth)Acrylic Group Modified Polymers (P3) and (P4)

The (meth)acrylic group-modified polymers shown in the Formulae P2, P3 and P4 of the present invention are characterised by the fact they are monodispersed. That is to say n1 and n2 are arranged in a high level.

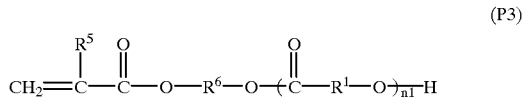

(wherein $R^1$ is —$(CR^3R^4)_k$— with k being an integer of 2 to 8, the groups $R^3$ and $R^4$ being independently hydrogen or methyl group ; the k units of $R^3$ and $R^4$ may be identical or different groups, $R^5$ is hydrogen or a methyl group, R6 is an alkylene group of 1 to 10 carbons, no is an integer of 0 to 100)

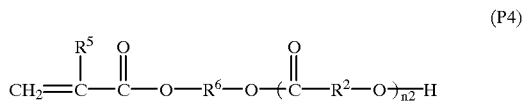

(wherein $R^2$ and $R^6$ are alkylene groups of 1 to 10 carbons, $R^5$ is hydrogen or a methyl group, $n_2$ is an integer from 1 to 100)

As well as in the Formula P2, in the Formulae P3 and P4, $R^1$ may be for example, an ethylene group, a propylene group, a trimethylene group, a tetramethylene group, a pentamethylene group, or an hexamethylene group; $R^2$ may be a trimethylene group, a 2-methyltrimethylene group, a 2, 2-dimethyltrimethylene group or a tetramethylene group.

In the Formulae P3 and P4, $n_1$ and $n_2$ are each integer in the range of 1 to 100 and normally 1 to 10.

In case of random copolymers and block copolymers, the relation between $n_1$ and $n_2$ is as explained in the Formulae P1 and P2.

For example, the (meth)acrylic group-modified polymers of the prior art have a structure according to Formula P2 but with a large variation for the value of $n1_1$ as disclosed in JP-A-63066307 and JP-A-64025322. They are mixture of (meth)acrylic group modified lactone of various molecular weights.

The (meth)acrylic group-modified lactone polymers of the present invention or the like are monodispersed. In paint materials and modifiers for polymers, they are substances having not only physical and chemical properties for product forming and a controlled purity but also substances having a very good reactivity and workability for production. or polymers, they are substances having not only physical and chemical properties for product forming and a controlled purity but also substances having a very good reactivity and workability for production.

For example, in the market of radical copolymers such as styrene, methylmethacrylate, (meth)acrylic group-modified lactone polymers which are disclosed as paint materials in JP-A-6425322, when the molecular weight of the (meth) acrylic group-modified lactone polymers is monodispersed, the following new advantages ①' to ③' appear and can be given as examples.

①' when preparing a crosslinked and cured film from the above-mentioned radical copolymers and polyvalent isocyanates, since the reactivity of the hydroxyl groups in the termini of the molecule is the same, the crosslinking density is high, the synthesised film has a uniform by crosslinked structure; the film itself has excellent properties such as rigidity, ductibility, weatherability, scratch resistance, low-temperature resistance and film-forming ability.

②' radical polymerizability, storage stability, crystallisation temperature or other several characteristics of the polymers which reflects chemical and physical properties of (meth)acrylic group-modified lactone polymers themselves are clearly controlled.

③' the impurities in products are very few.

Further, when the (meth)acrylic modified carbonate polymers and the (meth)acrylic group modified-lactone-carbonate copolymers are monodispersed, the same advantages appear.

According to the invention, the polylactones, polycarbonates and lactone-carbonate copolymers having as a characteristic a narrow average molecular weight distribution, i.e. a small weight-average molecular-weight (Mw)/number-average molecular-weight (Mn) ratio, Mw/Mn, from 1.0 to 2.5 preferably from 1.2 to 2.0, are obtained.

It is known that it is preferable to use high molecular weight polymers to form by melting thin products such as film. However, generally, when transforming high molecular weight polymers into films, and when using polymers having a large molecular weight distribution, it has been discovered that compounds having a higher molecular weight form a gel rendering the film non uniform.

Consequently, when using the polymers of the invention having a narrow molecular weight distribution to form films, there is almost no gel formation involving a non uniform film; when making a film having not more than 20 non-uniform spots per 0.1 m², preferably not more than 15 spots and more preferably not more than 10 spots, the polymers have excellent film-forming properties.

The polylactones, polycarbonates and lactone-carbonate copolymers of the present invention are suitable materials for forming various products such as fibres, sheets, films and flasks using any known method use for thermally moulding resins like moulding by a moulding die, extrusion, inflation or the like.

EXAMPLES

The present invention will be further explained on the basis of the following Examples. However, the present invention is not limited to the following Examples.

Further, in the present invention, the average molecular weight is measured by gel permeation chromatography in tetrahydrofuran at 40° C.

Preparation Example 1

First Preparation of a Titanium-Type Lewis Acid 8.82 g, (40 mmol) of 2, 6-di-tert-butyl-4-methylphenol recrystallised using hexane were dissolved in 500 ml of dried hexane. 5.9 ml, (20mmol) of titanium (IV) isopropoxide were dropped in at room temperature. After the completion of dropping, the mixture was stirred for 2 hours and then heat at 60° C. After heating, 450 ml of hexane was distilled out under reduced pressure. The mixture was then left at 0° C. for 10 hours. Crystals of 2, 6-ditert-butyl4-methylphenyl-bis-substituted titanium-type Lewis acid (abbreviated as DiPti(BMP)) (A) were obtained. The re-crystallised crystals were washed twice with dry hexane and residue was vacuum dried (8.0g, yield of 67%). The crystals were then dissolved in dichloromethane to form a 0.3 mmol/l solution.

Preparation Example 2

Second Preparation of a Titanium-Type Lewis Acid 6.81 g, (20 mmol) of 2, 2'-methylenebis-(6-tert-butyl4-methylphenol), recrystallised using hexane, were dissolved in 500 ml of dried hexane. 2.2 ml, (20 mmol) of titanium tetrachloride was dropped at room temperature. After dropping, the mixture was stirred for 2 hours and then heat at 60° C. to verify that the insoluble materials were dissolved. The mixture was then left at room temperature for 10 hours. Dark-red crystals of 2, 2'-methylenebis-(6-tert-butyl-4-methyphenol) two substituted titanium-type Lewis acid were obtained. The recrystallised crystals were washed with dry hexane and residue was vacuum dried (6.82 g, yield of 74.5%). The crystals were then dissolved in dichloromethane to form a 0.3mmol/l solution which was reacted at room temperature with a suitable amount of propylene oxide. The resulting titanium-type Lewis acid (B) having the structure as shown in Formula T3' was obtained.

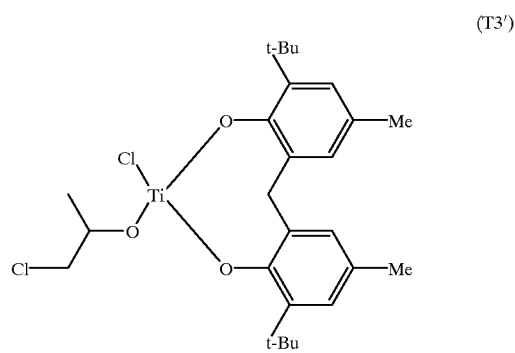

(T3')

Preparation Example 3

Third Preparation of a Titanium-Type Lewis Acid 6.19g, (20 mmol) of 2, 2'-methylenebis-(6-tert-butyl-4-methylphenol) recrystallised using hexane were dissolved in 500 ml of dry hexane. 5.9 ml, (20 mmol) of titanium (IV) isopropoxide were then dropped in at room temperature. After dropping, the mixture was stirred for 2 hours and then heat at 60° C. After heating, 450 ml of hexane were distilled out under reduced pressure. The mixture was then left at 0° C. for 10 hours. Crystals of 2, 2'-methylenebis-(6-tert-butyl4-methylphenol)-bis-substituted titanium-type Lewis acid (C) was obtained. The recrystallised crystals were washed with dry hexane and residue was vacuum dried (6.8 g, yield of 67%). The crystals were then dissolved in dichloromethane to form a 0.3mmol/l solution.

Preparation Example 4

Preparation of an Aluminium-Type Lewis Acid 2.76 g, (12.5 mmol) of 2, 6-ditert-butyl4-methylphenol were dissolved in 10 ml of dry hexane. 0.6 ml, (6.25 mmol) of trimethylaluminium were dropped in at 0° C. The thick mixture obtained was heated at 60° C. to dissolve all the materials. The mixture was then left at room temperature for 10 hours. White crystals of 2, 6-ditert-butyl-4-methylphenol two substituted aluminium-type Lewis acid were obtained (hereinafter abbreviated as MeAlBMP). The re-crystallised crystals were washed with dry hexane and dried under reduced pressure.

I. Preparation of a monodispersed polymer through titanium-type Lewis acid catalysis

Example 1

First Preparation of a (Living-Type)) Polymedsation of Neopentyl Glycol Carbonate 26.0 g, (200 mmol) of neopentyl glycol carbonate was measured out and introduced into a three-necked flask having a bowl base (provided with a magnetic stirrer) and replaced with nitrogen. 16.0 ml of dry dichloroethane were introduced through a syringe apparatus, under nitrogen flow. 0.77 ml, (10 mmol) of isopropyl alcohol was then added and then 1 ml of the 0.3mmol/ml dichloromethane solution of 2,6-ditert-butyl-4-methylphenol-two-substituted titanium-type Lewis acid (A) was then added and the mixture was reacted at 80° C. for 2 hours under stirring. In this time, all of the monomer was consumed. The resulting compound was poured into 300 ml of methanol and the white precipitate was dried under reduced pressure. 25.0 g of a carbonate polymer were then obtained. The number average molecular weight thereof was 2,400 and the molecular weight distribution was 1.17, both measured by GPC and recalculated with standard polystyrene.

Example I-2

Preparation of a (Living-Type)) Polymenisation of ε-Caprolactone (First One)

In the same apparatus as used in Example I-1, and according to the same operations, 22.8 g, (200 mmol) of ε-caprolactone, 16.0 ml of dry dichloromethane, 0.77 ml, (10 mmol) of isopropyl alcohol and 1ml of the 0.3 mmol/ml dichloromethane solution of the 2, 6-di-tert-butyl4-together and polymerised. 21.0 g of lactone polymer was then obtained. The number average molecular weight thereof was 2,200 and the molecular weight distribution was 1.08, both measured by GPC and recalculated with standard polystyrene.

Example I-3

Preparation of Neopentyl Glycol Carbonate-ε-Caprolactone Block Copolymer 6.59 g, (550 mmol) of neopentyl glycol carbonate were measured and introduced into the same apparatus as in Example I-1 under nitrogen atmosphere. 3 ml of dry dichloromethane were introduced through a syringe apparatus, under nitrogen flow. 0.077 ml, (1 mmol) of isopropyl alcohol was then added and then 1 ml of the 0.3mmol/ml dichloromethane solution of 2,6-ditert-butyl-4-methylphenol-bis-substituted titanium-type Lewis acid (A) was then added and the mixture was reacted at 60° C. for 4.0 hours under stirring. It was verified that the monomer had been consumed, and an extremely small amount of sample was taken out. Then, 5.7 g, (50 mmol) of ε-caprolactone was then added and the polymerisation was continued under stirring for 1.5 hour at room temperature. The reacting compound was poured into 300mi of methanol and the white precipitate was dried under reduced pressure. 11.0 g of block copolymer were thus obtained.

The number average molecular weight of the previous neopentyl glycol carbonate polymer was 6.100 and the molecular weight distribution was 1.20. The number average molecular weight of the block copolymer was 13.200 and the molecular weight distribution was 1.22. It was checked by 1 H-NMR that this resin shows a ratio of isopropyl alcohol/neopentyl glycol carbonate/ε-caprolactone of 1.0/50.0/46.8.

Example I-4

Preparation of a Living-Type Polymedsation of ε-Caprolactone (Second One)

In the same apparatus as used in Example I-1, and according to the same operations, 11.0 ml, (100 mmol) of ε-caprolactone, 3 ml of dry dichloromethane, 0.077 ml, (1 mmol) of isopropyl alcohol and 1 ml of the 0.3 mmol/ml toluene solution of the titanium-type Lewis acid (B) obtained in Example 2 was stirred at room temperature for 6 hours. All of the monomer was then consumed. According to the same operations as explained in Example I-1, 10.6 g of lactone polymer was then obtained. The number average molecular weight thereof was 13,100 and the molecular weight distribution was 1.15, both measured by GPC and recalculated with standard polystyrene.

Example I-5

Preparation of a Monodispersed Methacrylic Group-Modified Lactone 4 Tetramer 130 g, (1 mol) of 2-hydroxyethyl methacrylate, 456.6 g, (4 mol) of ε-caprolactone and 3 ml of the a,3 mmol/ml dichloromethane solution of 2, 2'-methylenebis-(6-tert-butyl4-methylphenol)-bis-substituted titanium-type Lewis acid catalyst obtained in Example 3 were introduced into a four-neck flask quipped with an air inlet, a thermostat, a condenser and a stirrer. The mixture was stirred for 5 hours at 60° C. while introducing dry air. The dope (viscous polymer solution) obtained was measured by GPC and diluted in toluene, and purified on a silica gel column to give 570 g of a monodispersed methacrylic group-modified lactone tetramer.

The number average molecular weight thereof was 470 and the molecular weight distribution was 1.08, both measured by GPC and recalculated with standard polystyrene.

Comparative Example I-1

Second Preparation of a <<Living-Type>>Polymensation of Neopentylglycolcarbonate Instead of using 2, 6-ditert-butyl4-methylphenol-2-substituted titanium-type Lewis acid (A) as in Example I-1, 1 ml of a 0.3 mmol/ml of a dichloromethane solution of titanium (IV) butoxide was used. The operations were then the same as Example I-1 and the white precipitate obtained was dried under reduced pressure. The amount of the carbonate polymer obtained was 23.5 g. The number average molecular weight 311 thereof was 2,200 and the molecular weight distribution was 2.50, both measured by GPC and recalculated with standard polystyrene.

Comparative Example I-2

Preparation of a Living-Type Polymefisation of ε-Caprolactone (Third One)

Instead of using 2, 6-ditert-butyl4-methylphenol-bis-substituted titanium-type Lewis acid (A) as in Example I-2, 1 ml of a 0.3 mmol/ml of a dichloromethane solution of titanium (IV) butoxide was used. The protocol was then the same as Example I-2 and 21.5 g of lactone polymer were then obtained. The number average molecular weight thereof was 2,300 and the molecular weight distribution was 2.20, both measured by GPC and recalculated with standard polystyrene.

Example I-6

Preparation of a Living-Type Polymerisation of ε-Caprolactone (Fourth One)

Instead of using 2, 6-ditert-butyl4-methylphenol-bis-substituted titanium-type Lewis acid (A) as in Example I-2, 1 ml of a 0.3 mmol/ml of a dichloromethane solution of titanium (IV) butoxide was used. The operations were then the same as Example I-2 and 21.5 g of lactone polymer was then obtained. The number average molecular weight thereof was 2,200 and the molecular weight distribution was 1.50, both measured by GPC and recalculated with standard polystyrene.

II Continuous preparation of Polymers having narrow molecular weight distribution using aluminium-type Lewis acid or titanium-type Lewis acid In the following Examples, an extruder used had an internal diameter of 47 mm and a ratio of UD of 40 which is a twin-screen type of simultaneously coupling in identical directions.

Examples II-1 and II-2

0.062 parts by weight of ethylene glycol used as an initiator was added and mixed with 100 weight parts of ε-caprolactone into a tank maintained under a nitrogen flow. 0.1 mol of MeAIBMP (Example II-1) obtained in Example 4 or DiPT(BMP) (Example II-2) with respect to I mol of ethylene glycol were introduced into the tank and stirred.

The solution mixture obtained was kept at a heating medium temperature of 150° C. and fed into the extruder at a speed of 1 kg/hr through a pump directly connected to the extruder feeding inlet. Further, since the extruder is provided with a jacket, a fluid at the heating medium temperature maintained at 150° C. is circulated through the internal jacket. Under stable conditions, the temperature of the resin discharged out of the extruder was measured. This temperature was 178° C. and 172° C. for Example II-1 and Example II-2, respectively.

The resin obtained was then cooled in a water tank and broken in order to obtain a plate. The staying time was measured by injecting a food red colour into the feeding materials and checking the colour of the extruded resin. The staying time was approximately 30 min.

The number average molecular weight and the molecular weight distribution Mw/Mn of the resin obtained were evaluated by GPC. The resins obtained was dried under reduced pressure at 50° C. for 24 hours and extruded through a T-die to form a film having thickness of 50 μm. The gel-like non uniform spots in 0.1 m2 of this film were the measured. The results are in Table 1.

Example II-3 and Example II-4

Instead of ε-caprolactone, a mixture of 100 weight parts of neopentyl glycol carbonate (Example II-3) and a mixture 50 weight parts of neopentyl glycol carbonate (Example II-4) were used. The heating media temperature was set at 160° C. and the operations were the same as in Example II-1. Further, the temperature of the extruded resin was 181° C. (Example II-3) and 185° C. (Example II-4, random polymer). The results are as shown in Table 1.

Example II-5

In a back stage of the extruder of Example II-1, a second extruder was set through a pipe heated by a ribbon heater to form the second continuous reactor for forming block polymers. The second extruder is provided with a second tank for the copolymer. Neopentyl glycol carbonate was fed into the second extruder at a speed of 0.5 Kg/hour. In the previous step, polyneopentyl glycol carbonate was obtained after polymerisation of polycaprolactone and ethylene glycol as an initiator as in Example II-1. The temperature of the resin extruded out of an outlet in the second extruder was 170° C. The results are as shown in Table 1.

Comparative Example II-1

Instead of initiator and MeAIBMP, 0.082 weight parts of aluminium tributoxide was used. The same operations as in Example II-1 were then applied. The aluminium tributoxide used was previously diluted to form a 2% weight amount solution. The temperature of the extruded resin was 177° C. The results are as shown in Table 1.

Comparative Example II-2

0.034 parts by weight of titanium (IV) butoxide was used as a catalyst. The same operations as in Example II-2 was then applied.

The temperature of the extruded resin was 170° C. The results are as shown in Table I.

Comparative Example II-3

0.063 parts by weight of dibutyltin dilaurate was used as a catalyst. The same operations as in Example II-1 was then applied.

However, the viscosity of the resin obtained was not suitable to obtain a plate.

Comparative Example II-4

Batch Polymenisation of ε-Caprolactone 15 kg, (132 mol) of ε-caprolactone was introduced into a reaction tank made of a stainless steel. The inside air was replaced with nitrogen. Then, 9.3 g, (0.15 mol) of ethylene glycol were added in a proportion equal to 0.1 mol with respect to one mole of 2, 6-ditert-butyl-4-methylphenol-bis-substituted aluminium-type Lewis acid. The resulting mixture was stirred for 3 hours at 170° C. All the monomer was then consumed. The reaction product was then pull out of the reaction tank through a gear pump provided on the bottom part of the reaction tank. The amount of carbonate polymer obtained was 14.2 kg.

The number average molecular weight thereof was 150,000 and the molecular weight distribution was 2.0, both measured by GPC and recalculated with standard polystyrene. The gel-like non uniform spots in 0.1 m$^2$ of this film were the measured. The results are as in Table 1.

|  | weight average molecular weight Mw | molecular weight distribution Mw/Mn | number of gel-like non-uniform spots /0.1 m$^2$ |
| --- | --- | --- | --- |
| Example II-1 | 125,000 | 1.6 | 5 |
| Example II-2 | 130,000 | 1.7 | 11 |
| Example II-3 | 130,000 | 1.8 | 19 |
| Example II-4 | 135,000 | 1.9 | 20 |
| Example II-5 | 185,000 | 1.6 | 12 |
| Comparative Example II-1 | 165,000 | 2.5 | 92 |
| Comparative Example II-2 | 125,000 | 3.1 | 30 |
| Comparative Example II-4 | 150,000 | 2.0 | 65 |

On the basis of the results of Table 1, compared with catalysts in the prior art, lactone polymers can be more easily produced in a continuous manner according to the method of the present invention. The polymers obtained have a narrow molecular weight distribution and few gel-like non-uniform spots. Thus, they are highly expected to be materials for products of good quality.

Industrial Fields Where the Present Invention May Be Used

According to the method of present invention, it is possible to produce with a high yield and in a short time lactone polymers, carbonate polymers, lactone-carbonate random copolymers and lactone-carbonate block copolymers. The polymers obtained have a molecular weight distribution value (Mw/Mn) approximately equal to 1 or a single-structure components which are extremely high. These polymers having excellent rigidity, ductility, weatherability, scratch resistance, low temperature resistance and coating properties may be used as high ranking polyurethane materials, paint materials or modifiers for resins.

Moreover, according to the method of the present invention, a continuous polymerisation reaction is possible inside an extruder with a high production rate. Further, it is possible to efficiently produce high ranking lactone polymers, carbonate polymers and lactone-carbonate copolymers having a high molecular weight such as from 10,000 to 200,000, narrow molecular weight distribution such as from 1.0 to 2.5, having an extremely high single-structure components and few lumps or other gel-like non uniform spots. The resulting polymers may advantageously be used in fields such as modifiers for resins, coatings, surface improving agents, adhesives or in other fields, to higher the added value of products or to produce high functional products.

Further, each of these polymers may also be used as forming materials. Since they have a homogenous composition, they may advantageously be used, specially in fields of films and fibres.

What is claimed is:

1. A method for preparing a monodispersed polymer via a ring-opening addition-reaction between a lactone monomer (b1), a cyclic carbonate monomer (b2) or a mixture (b3) of said lactone monomer (b1) and said cyclic carbonate monomer (b2), using an initiator (a), said method being characterized in that a titanium-type Lewis acid of General Formula T1 is used as a catalyst

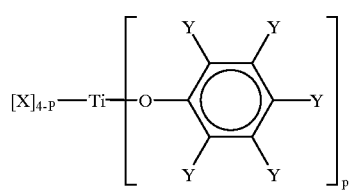

(T1)

wherein X is selected from alkoxy groups (when shown by RO, R is an alkyl group which may have any substituents), a chlorine atom, a bromine atom, an iodine atom, Y is hydrogen atom or a substituent, P is an integer from 1 to 4.

2. The method of claim 1, characterized in that a lactone-carbonate random copolymer is obtained via reacting a total mole amount of said lactone monomer (b1) and said cyclic carbonate monomer (b2) or said mixture (b3) thereof comprised between 1 and 100 moles with respect to 1 mole of said initiator (a).

3. A method for preparing a lactone-carbonate random copolymer via a ring-opening addition reaction of a lactone monomer (b1) and a cyclic carbonate monomer (b2) with an initiator (a) until any one of said monomers is consumed and then by undertaking a ring-opening addition reaction of said remaining monomer, said method being characterized in that the titanium-type Lewis acid of General Formula T1 is used as catalyst

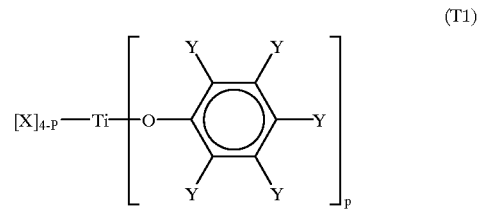

(T1)

wherein X is selected from alkoxy groups (when shown by RO, R is an alkyl group which may have any substituents), a chlorine atom, a bromine atom, an iodine atom, Y is hydrogen atom or a substituent, P is an integer from 1 to 4.

4. A method according to claim 1, wherein the titanium Lewis acid (cT) is a compound represented by General formula T2 described below

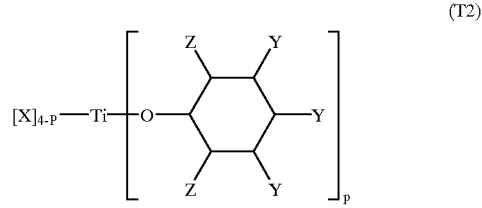

(T2)

wherein X is selected alkoxy groups (when shown by RO, R is an alkyl group which may have any substituents), a chlorine atom, a bromine atom, an iodine atom, Y is a hydrogen atom or a substituent, Z is selected from tert-butyl group, phenyl group, a chlorine atom, a bromine atom, a iodine atom and P is an integer from 1 to 3.

5. A method according to claim 1, wherein said initiator (a) is a polyvalent alcohol containing from 2 to 10 hydroxyl groups in its molecule or an alcohol containing 1 hydroxyl group and one double-bond which is radically polymerizable.

6. A method according to claim 1, wherein the titanium-type Lewis acid (cT) is a compound represented by General formula T3 described below

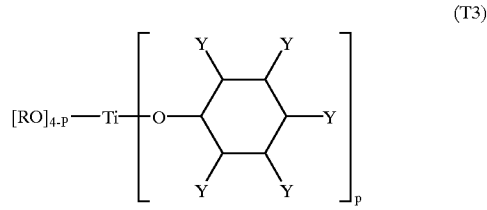

(T3)

wherein R is an alkyl group which may have any substituents, Y is a hydrogen atom or a substituted group, P is an integer from 1 to 3.

7. A method for preparing lactone polymers characterised in that a lactone monomer (b1), a cyclic carbonate monomer (b2) or a mixture (b3) thereof are continuously polymerized using an initiator (a) in an extruder via a ring-opening addition reaction and using the aluminium-type Lewis via a ring-opening addition reaction and using the aluminium-type Lewis acid of General Formula A1 or the titanium-type Lewis acid of General Formula T1 as catalyst

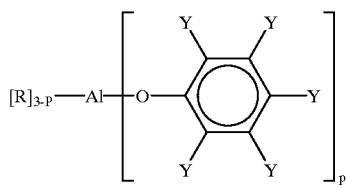

(A1)

wherein R is an alkyl group having 1 to 4 carbons, Y is a hydrogen atom or a substituent, P is an integer equal to 2 or 3

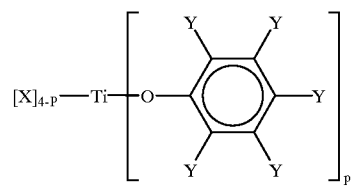

(T1)

wherein X is selected from alkoxy groups (when shown by RO, R is an alkyl group which may have any substituents), a chlorine atom, a bromine atom, an iodine atom, Y is a hydrogen atom or a substituent, P is an integer from 1 to 4.

8. A method according to claim 7, wherein the aluminium-type Lewis acid (cA) is a compound represented by any General Formula A2 described below and the titanium-type Lewis acid (cT) is a compound represented by General Formula T2 described below

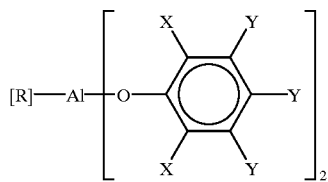

(A2)

wherein R is an alkyl group having from 1 to 4 carbons, X is selected from tert-butyl group, phenyl groups, a chlorine atom, a bromine atom and a iodine atom, Y is a hydrogen atom or optionally a substituent

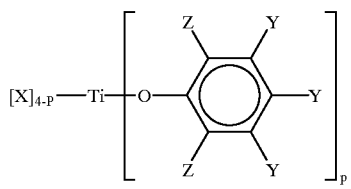

(T2)

wherein X is selected from alkoxy groups (when shown by RO, R is an alkyl group which may have any substituted groups), a chlorine atom, a bromine atom, and an iodine atom, Y is a hydrogen atom or a substituent, Z is chosen among tert-butyl group, phenyl groups, a chlorine atom, a bromine atom, a iodine atom and P is an integer from 1 to 3.

9. Lactone polymers, cyclic carbonate polymers and lactone-cyclic carbonate copolymers having a weight-average molecular-weight (Mw) of 10,000 to 200,000 and a weight-average molecular-weight (Mw)/number-average molecular-weight (Mn) ratio of 1.0 to 2.5.

10. Lactone polymers, cyclic carbonate polymers and lactone-cyclic carbonate copolymers of claim 9 which have a Mw/Mn ratio of 1.2 to 2.0.

11. Lactone polymers, cyclic carbonate polymers and lactone- cyclic carbonate copolymers of claim 9 which have a gel content of not more than 20 gel-effect non-uniform spots per 0.1 m².

12. Lactone polymers of claim 9 having a weight average-molecular weight (Mw) of 100,000 to 200,000.

13. Cyclic carbonate polymers of claim 9 having a weight average-molecular weight (Mw) of 10,000 to 200,000.

14. Lactone-cyclic carbonate block copolymers having a weight average-molecular weight (Mw) of 30,000 to 200,000.

15. Lactone-cyclic carbonate random copolymers having a weight average-molecular weight (Mw) of 10,000 to 200,000.

16. A method according to claim 2, wherein the titanium Lewis acid (cT) is a compound represented by General formula T2 described below

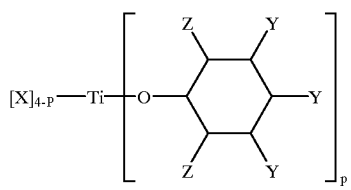

(T2)

wherein X is selected alkoxy groups (when shown by RO, R is an alkyl group which may have any substituents), a chlorine atom, a bromine atom, an iodine atom, Y is a hydrogen atom or a substituent, Z is selected from tert-butyl group, phenyl group, a chlorine atom, a bromine atom, a iodine atom and P is an integer from 1 to 3.

17. A method according to claim 3, wherein the titanium Lewis acid (cT) is a compound represented by General formula T2 described below

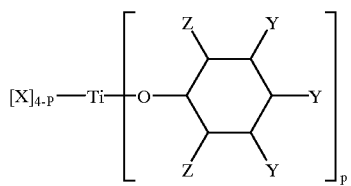

(T2)

wherein X is selected alkoxy groups (when shown by RO, R is an alkyl group which may have any substituents), a chlorine atom, a bromine atom, an iodine atom, Y is a hydrogen atom or a substituent, Z is selected from tert-butyl group, phenyl group, a chlorine atom, a bromine atom, a iodine atom and P is an integer from 1 to 3.

18. A method according to claim 2, wherein said initiator (a) is a polyvalent alcohol containing from 2 to 10 hydroxyl groups in its molecule or an alcohol containing 1 hydroxyl group and one double-bond which is radically polymerizable.

19. A method according to claim 3, wherein said initiator (a) is a polyvalent alcohol containing from 2 to 10 hydroxyl groups in its molecule or an alcohol containing 1 hydroxyl group and one double-bond which is radically polymerizable.

20. A method according to claim 4, wherein said initiator (a) is a polyvalent alcohol containing from 2 to 10 hydroxyl groups in its molecule or an alcohol containing 1 hydroxyl group and one double-bond which is radically polymerizable.

21. A method according to claim 2, wherein the titanium-type Lewis acid (cT) is a compound represented by General formula T3 described below

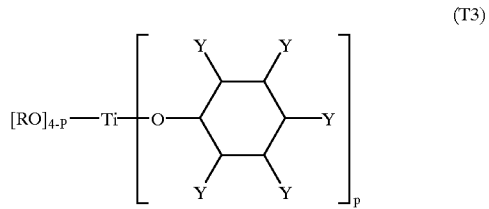

(T3)

wherein R is an alkyl group which may have any substituents, Y is a hydrogen atom or a substituted group, P is an integer from 1 to 3.

22. A method according to claim 3, wherein the titanium-type Lewis acid (cT) is a compound represented by General formula T3 described below

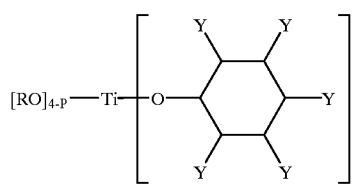

(T3)

wherein R is an alkyl group which may have any substituents, Y is a hydrogen atom or a substituted group, P is an integer from 1 to 3.

23. A method according to claim 4, wherein the titanium-type Lewis acid (cT) is a compound represented by General formula T3 described below

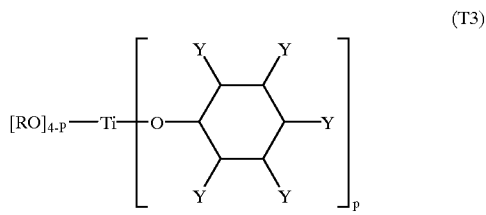

(T3)

wherein R is an alkyl group which may have any substituents, Y is a hydrogen atom or a substituted group, P is an integer from 1 to 3.

24. A method according to claim 5, wherein the titanium-type Lewis acid (cT) is a compound represented by General formula T3 described below

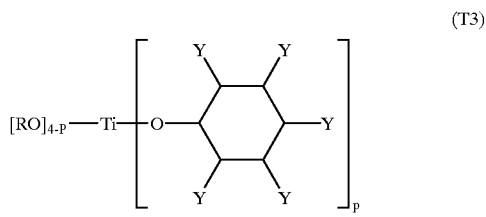

(T3)

wherein R is an alkyl group which may have any substituents, Y is a hydrogen atom or a substituted group, P is an integer from 1 to 3.

25. Lactone polymers, cyclic carbonate polymers and lactone-cyclic carbonate copolymers of claim 10 which have a gel content of not more than 20 gel-effect non-uniform spots per 0.1 $m^2$.

* * * * *